United States Patent
Jung et al.

(10) Patent No.: US 10,622,811 B2
(45) Date of Patent: Apr. 14, 2020

(54) STAND-ALONE MICRO-GRID AUTONOMOUS CONTROL SYSTEM AND METHOD

(71) Applicant: Korea Electric Power Corporation, Naju-si, Jeollanam-do (KR)

(72) Inventors: Won-Wook Jung, Daejeon (KR); Cheol-Min Chu, Daejeon (KR); Jung-Sung Park, Daejeon (KR); Sang-Yun Yun, Daejeon (KR); Seong-Chul Kwon, Daejeon (KR); Jeong-Hun Kim, Daejeon (KR)

(73) Assignee: Korea Electric Power Corporation, Naju-si, Jeollanam (KR)

( * ) Notice: Subject to any disclaimer, the term of this patent is extended or adjusted under 35 U.S.C. 154(b) by 100 days.

(21) Appl. No.: 15/758,210

(22) PCT Filed: Jul. 14, 2016

(86) PCT No.: PCT/KR2016/007691
§ 371 (c)(1),
(2) Date: Mar. 7, 2018

(87) PCT Pub. No.: WO2017/043751
PCT Pub. Date: Mar. 16, 2017

(65) Prior Publication Data
US 2018/0248374 A1   Aug. 30, 2018

(30) Foreign Application Priority Data
Sep. 8, 2015   (KR) .................. 10-2015-0127073

(51) Int. Cl.
*H02J 3/28*   (2006.01)
*H02J 3/38*   (2006.01)
(Continued)

(52) U.S. Cl.
CPC .................. *H02J 3/28* (2013.01); *H02J 3/32* (2013.01); *H02J 3/381* (2013.01); *H02J 3/383* (2013.01);
(Continued)

(58) Field of Classification Search
CPC ........ H02J 3/28; H02J 3/38; H02J 3/46; H02J 3/381–383; H02J 3/386; H02J 7/00;
(Continued)

(56) References Cited

U.S. PATENT DOCUMENTS

| | | | |
|---|---|---|---|
| 8,781,640 B1 * | 7/2014 | Miller | H02J 4/00 700/286 |
| 2012/0101639 A1 * | 4/2012 | Carralero | G06F 1/26 700/286 |

(Continued)

FOREIGN PATENT DOCUMENTS

| | | |
|---|---|---|
| JP | H09-140156 A | 5/1997 |
| JP | 2008-017652 A | 1/2008 |

(Continued)

OTHER PUBLICATIONS

International Search Report dated Oct. 20, 2016 issued in International Patent Application No. PCT/KR2016/007691 (with English translation).
(Continued)

*Primary Examiner* — Rexford N Barnie
*Assistant Examiner* — Jagdeep S Dhillon
(74) *Attorney, Agent, or Firm* — Morgan, Lewis & Bockius LLP

(57) ABSTRACT

Disclosed in a stand-alone micro-grid autonomous control system including: at least one battery system directly changing a reference frequency thereof according to a charge amount, and providing power having the changed reference frequency; at least one power generator measuring the reference frequency from the power provided form the at
(Continued)

least one battery system, and starting generating power or stopping generating power based on the measured reference frequency; and at least one load measuring the reference frequency from the power provided from the battery system, and performing a synchronization operation or a synchronization releasing operation based on the measured reference frequency.

16 Claims, 10 Drawing Sheets

(51) Int. Cl.
*H02J 3/32* (2006.01)
*H02J 3/46* (2006.01)

(52) U.S. Cl.
CPC ............ *H02J 3/386* (2013.01); *H02J 3/46* (2013.01); *Y02E 10/563* (2013.01); *Y02E 10/566* (2013.01); *Y02E 10/763* (2013.01); *Y02E 10/766* (2013.01); *Y02E 70/30* (2013.01); *Y02P 80/14* (2015.11)

(58) Field of Classification Search
CPC ............ H02J 7/35; H02J 7/0068; H02M 7/44; H02M 5/04; G05B 19/042; G05B 19/0428; G06F 1/26; G05F 1/70
USPC ............ 307/26, 18, 21, 19, 66, 64; 320/127, 320/137, 139, 138; 700/286, 291, 297, 700/287; 709/225
See application file for complete search history.

(56) References Cited

U.S. PATENT DOCUMENTS

| | | | |
|---|---|---|---|
| 2012/0283887 A1* | 11/2012 | Goldsmith | G06Q 50/06 700/287 |
| 2014/0097683 A1* | 4/2014 | Piyabongkarn | H02J 3/32 307/26 |
| 2014/0252855 A1* | 9/2014 | Watanabe | H02J 3/00 307/31 |
| 2014/0354234 A1* | 12/2014 | Sudan | H02J 7/0063 320/127 |
| 2015/0039145 A1* | 2/2015 | Yang | G05B 13/02 700/291 |
| 2015/0338868 A1* | 11/2015 | Takaguchi | H02J 3/32 307/126 |
| 2016/0204611 A1* | 7/2016 | Chambon | H02J 3/1835 307/26 |
| 2016/0313716 A1* | 10/2016 | Chen | H02J 4/00 |
| 2016/0329711 A1* | 11/2016 | Majumder | H02J 3/38 |
| 2016/0329713 A1* | 11/2016 | Berard | H02J 3/24 |
| 2017/0117713 A1* | 4/2017 | Majumder | H02J 3/32 |

FOREIGN PATENT DOCUMENTS

| | | |
|---|---|---|
| JP | 2008-141926 A | 6/2008 |
| JP | 2013-169067 A | 8/2013 |
| KR | 10-1412742 B1 | 7/2014 |

OTHER PUBLICATIONS

J-H. Jeon, et al., "A Novel Frequency Tracker for Islanded-Mode Operation in Microgrid," The Transaxtion of the Korean Institute of Electrical Engineers, vol. 60, No. 7, The Korean Institute of Electrical Engineers, Jul. 2011, pp. 1331-1338.

* cited by examiner

| PRIORITY | NAME OF APPARATUSES | FREQUENCY AND TIME SETTING | OPERATIONAL STATE |
|---|---|---|---|
| 1 | FIRST DIESEL POWER GENERATOR | 60.2Hz & 1MIN | STOPPED |
| 2 | SECOND DIESEL POWER GENERATOR | 60.2Hz & 2MIN | STOPPED |
| 3 | FIRST PHOTOVOLTAIC POWER GENERATOR | 60.2Hz & 3MIN | STOPPED |
| 4 | SECOND PHOTOVOLTAIC POWER GENERATOR | 60.2Hz & 4MIN | STOPPED |
| 5 | FIRST WIND POWER GENERATOR | 60.2Hz & 5MIN | STOPPED |
| 6 | SECOND WIND POWER GENERATOR | 60.2Hz & 6MIN | STOPPED |
| 7 | FIRST LOAD (CONTROLLABLE) | 60.2Hz & 7MIN | SYNCHRONIZED |
| 8 | SECOND LOAD (CONTROLLABLE) | 60.2Hz & 8MIN | SYNCHRONIZED |

FIG. 9

| PRIORITY | NAME OF APPARATUSES | OUTPUT FREQUENCY OF BATTERY | ELAPSED TIME | AUTONOMOUS CONTROL RESULTS OF APPARATUSES |
|---|---|---|---|---|
| A1 | INCREASING IN CHARGE AMOUNT OF BATTERY CHARGE AMOUNT REACHING ON UPPER END | 60.0Hz (RATED FREQUENCY) | - | ALL APPARATUSES MAINTAINING INITIAL STATES |
| A2 | INCREASING IN CHARGE AMOUNT OF BATTERY | 60.2Hz (RATED FREQUENCY) | 2MIN | FIRST(SECOND) DIESEL POWER GENERATOR BEING STOPPED (INITIAL STATES) |
| A2 | INCREASING IN CHARGE AMOUNT OF BATTERY | 60.2Hz (RATED FREQUENCY) | 3MIN | FIRST PHOTOVOLTAIC POWER GENERATOR BEING STOPPED |
| A2 | INCREASING IN CHARGE AMOUNT OF BATTERY | 60.2Hz (RATED FREQUENCY) | 4MIN | SECOND PHOTOVOLTAIC POWER GENERATOR BEING STOPPED |
| A3 | SWITCHING TO DISCHARGING STATE CHARGE AMOUNT BEING WITHIN UPPER END DANGEROUS RANGE | 60 AND 60.2Hz PERIODICAL FLUCTUATION | - | ALL APPARATUSES MAINTAINING STATES OF TEMPORAL SECTION A2 |
| A4 | INCREASING IN CHARGE AMOUNT OF BATTERY CHARGE AMOUNT REACHING ON UPPER END | 60.2Hz (RATED FREQUENCY) | 4MIN | FIRST(SECOND) DIESEL POWER GENERATOR BEING STOPPED FIRST(SECOND) PHOTOVOLTAIC POWER GENERATOR BEING STOPPED |
| A4 | INCREASING IN CHARGE AMOUNT OF BATTERY CHARGE AMOUNT REACHING ON UPPER END | 60.2Hz (RATED FREQUENCY) | 5MIN | FIRST WIND POWER GENERATOR BEING STOPPED |
| A4 | INCREASING IN CHARGE AMOUNT OF BATTERY CHARGE AMOUNT REACHING ON UPPER END | 60.2Hz (RATED FREQUENCY) | 6MIN | SECOND WIND POWER GENERATOR BEING STOPPED |
| A4 | INCREASING IN CHARGE AMOUNT OF BATTERY CHARGE AMOUNT REACHING ON UPPER END | 60.2Hz (RATED FREQUENCY) | 7MIN | FIRST LOAD BEING SYNCHRONIZED |
| A5 | SWITCHING TO DISCHARGING STATE CHARGE AMOUNT BEING WITHIN UPPER END DANGEROUS RANGE | 60 AND 60.2Hz RATED FREQUENCY | - | ALL APPARATUSES MAINTAINING STATES OF TEMPORAL SECTION A4 |
| A6 | AMOUNT REACHING ON NORMAL RANGE | 60.0Hz (RATED FREQUENCY) | 5MIN | ALL APPARATUSES RETURNING INITIAL STATES |

FIG. 11

| PRIORITY | NAME OF APPARATUSES | FREQUENCY AND TIME SETTING | OPERATIONAL STATE |
|---|---|---|---|
| 1 | FIRST PHOTOVOLTAIC POWER GENERATOR | 59.8Hz & 1MIN | SYNCHRONIZED |
| 2 | SECOND PHOTOVOLTAIC POWER GENERATOR | 59.8Hz & 2MIN | SYNCHRONIZED |
| 3 | FIRST WIND POWER GENERATOR | 59.8Hz & 3MIN | SYNCHRONIZED |
| 4 | SECOND WIND POWER GENERATOR | 59.8Hz & 4MIN | SYNCHRONIZED |
| 5 | FIRST LOAD (CONTROLLABLE) | 59.8Hz & 5MIN | STOPPED |
| 6 | SECOND LOAD (CONTROLLABLE) | 59.8Hz & 6MIN | STOPPED |
| 7 | FIRST DIESEL POWER GENERATOR | 59.8Hz & 7MIN | SYNCHRONIZED & OPERATING IN RATED FREQUENCY |
| 8 | SECOND DIESEL POWER GENERATOR | 59.8Hz & 7MIN | SYNCHRONIZED & OPERATING IN RATED FREQUENCY |

FIG. 12

STAND-ALONE MICRO-GRID AUTONOMOUS CONTROL SYSTEM AND METHOD

RELATED APPLICATIONS

This application is the U.S. National Phase under 35 U.S.C. § 371 of International Application No. PCT/KR2016/007691, filed on Jul. 14, 2016 which in turn claims the benefit of Korean Patent Application No. 10-2015-0127073 filed on Sep. 8, 2015, the disclosures of which applications are incorporated by reference herein.

TECHNICAL FIELD

The present invention relates to a system and method of autonomously controlling a stand-alone micro-grid, wherein a battery system maintains a charge amount of a battery within a proper range by directly controlling a power generator and a load of the stand-alone micro-grid by using an output frequency of the battery system.

BACKGROUND ART

Conventionally, diesel power generators are used for providing power to island areas that are isolated from large power systems on mainland areas. When power is provided by using diesel power generators, there is no technical difficulty since output power is autonomously controlled according to changes in loads.

However, recently, renewable energy sources including sunlight, wind power, etc. have been introduced in this area for supplying environmentally friendly electric power, and a battery is necessarily introduced together to compensate for the unstable output of such renewable energy. Herein, a "stand-alone micro-grid" may be defined as a system independently providing power from power generation sources such as battery, diesel power generator, etc. which are separated from a large scale power system.

Herein, due to the unstable output of renewable energy, the stand-alone micro-grid needs to maintain a frequency by adjusting in real time power supply according to demand. Generally, since the outputs of photovoltaic power generation, wind power generation, and other renewable energy source fluctuate, a battery performs the role of adjusting the entire power supply according to demand by holding surplus power generated by a photovoltaic power generator, a wind power generator, and a diesel power generator, or by discharging power when supply is insufficient even though the photovoltaic power generator, the wind power generator, and the diesel power generator are operated. In other words, the battery performs the role of maintaining the frequency of the stand-alone micro-grid.

However, there is a limit for the battery in terms of charge capacity (kWh) and discharge capacity (kWh). Accordingly, there is no major problem in adjusting power supply according to demand within the short term, but unless special measures are taken for long term, there may be problems with the overall adjustment of electricity supply according to demand.

For example, when there is sufficient wind and sunlight so that a power amount generated from renewable energy is greater than a load, a charge amount of a battery will continuously increase. As a result, the battery becomes fully charged, and the battery is no longer able to store remaining energy. In such a case, output power obtained from renewable energy source is forcibly reduced or stopped, or a dummy load is synchronized to consume the energy.

Alternatively, when there is insufficient or sunshine due to cloudy weather so that an output from renewable energy source is too low and the battery discharges power, a charge amount of the battery becomes low and a diesel power generator is operated to ensure sufficient power. In order to adjust power supply according to demand in the above cases, conventionally, an additional operational system that is identical to an energy market system (EMS) is implemented so that the system autonomous performs necessary actions.

However, when implementing an additional EMS, problems arise in terms of efficiency and economy. In other words, in order to implement an EMS and designing a stand-alone micro-grid in a small island area, implementation of communication infrastructure for all power generators and loads is required, and each of power generators and loads has to include a communication function. In addition, implementation of an expensive operational system is required, and a database of the corresponding site, development in human machine interface (HMI) etc., are also required, thereby taking a long time and inquiring high cost.

Accordingly, when designing a stand-alone micro-grid, a method of adjusting power supply according to demand of an independent system without implementing an EMS is required, and, rather than using a control method and a central data processing based on an EMS, a system and method of autonomously controlling a stand-alone micro-grid system wherein respective apparatuses provided for power supply according to demand, such as diesel power generators, power generators using renewable energy, loads, etc. are autonomously controlled by a frequency output from a battery system, is required.

DISCLOSURE

Technical Problem

Accordingly, the present invention has been made keeping in mind the above problems occurring in the prior art, and an object of the present invention is to enable a battery system constituting the stand-alone micro-grid to adjust an output frequency of a battery according to a charge amount of the battery, and to enable respective apparatuses including diesel power generators, power generators using renewable energy, and loads to check a current charge state of the battery.

In addition, another object of the present invention is to enable respective apparatuses including diesel power generators, power generators using renewable energy, and loads to autonomously control operations thereof according to a current charge state of a battery.

Technical Solution

In order to accomplish the above object, a stand-alone micro-grid autonomous control system according to an embodiment of the present invention includes: at least one battery system directly changing a reference frequency thereof according to a charge amount, and providing power having the changed reference frequency; at least one power generator measuring the reference frequency from the power provided form the at least one battery system, and starting generating power or stopping generating power based on the measured reference frequency; and at least one load measuring the reference frequency from the power provided from the battery system, and performing a synchronization operation or a synchronization releasing operation based on the measured reference frequency.

Herein, when the charge amount is greater than a preset maximum permissible charge amount, the at least one battery system may change the reference frequency to be greater than a rated frequency by a preset value.

Herein, when the measured reference frequency is greater than the rated frequency by the preset value, the at least one power generator may stop generating power and the at least one load may perform the synchronization operation.

Meanwhile, when the charge amount is less than a preset minimum permissible charge amount, the at least one battery system may change a reference frequency to be lower than a rated frequency by a preset value.

When the measured reference frequency is lower than the rated frequency by the preset value, the at least one power generator may stop generating power and the at least one load may perform the synchronization releasing operation.

According to a time during which the changed reference frequency is maintained, the at least one power generator sequentially may start generating power or stop generating power according to a preset order, and the at least one load sequentially may perform the synchronization operation or the synchronization releasing operation according to a preset order.

Herein, the at least one power generator may include at least one diesel power generator, at least one wind power generator, and at least one photovoltaic power generator.

Meanwhile, when the charge amount is less than a preset maximum permissible charge amount and is greater than a preset safety range, the at least one battery system may alternately repeatedly change the reference frequency between a rated frequency and a frequency greater than the rated frequency by a preset value.

Herein, when the charge amount is greater than a preset minimum permissible charge amount and less than a preset safety range, the at least one battery system may alternately repeatedly change the reference frequency between a rated frequency and a frequency lower than the rated frequency by a preset value.

In order to accomplish the above object, a stand-alone micro-grid autonomous control method according to an embodiment of the present invention includes: measuring, by at least one battery system, a charge amount; directly changing, by the least one battery system, a reference frequency thereof according to the measured charge amount, and providing power having the changed reference frequency; and measuring, by at least one power generator, the reference frequency from the power provided from the battery system and starting generating power or stopping generating power based on the measured reference frequency, and measuring, by at least one load, the reference frequency from the power provided from the battery system and performing a synchronization operation or a synchronization releasing operation based on the measured reference frequency.

Herein, in the providing of the power, when the charge amount is greater than a preset maximum permissible charge amount, the at least one battery system may change the reference frequency to be greater than a rated frequency by a preset value.

Meanwhile, in the generating of the power by the at least one power generator and performing of the operation by the at least one load, when the measured reference frequency is greater that the rated frequency by the preset value, the at least one power generator may stop generating power and the at least one load may perform the synchronization operation.

In addition, in the providing of the power, when the charge amount is less than a preset minimum permissible charge amount, the at least one battery system may change the reference frequency to be lower than a rated frequency by a preset value.

Meanwhile, in the generating of the power by the at least one power generator and the performing of the operation by the at least one load, when the measured reference frequency is lower than the rated frequency by the preset value, the at least one power generator may stop generating power and the at least load may perform the synchronization releasing operation.

Herein, in the generating of the power by the at least one power generator and performing of the operation by the at least one load, according to a time during which the changed reference frequency is maintained, the at least one power generator may sequentially start generating power or sequentially stop generating power according to a preset order, and the least one load may sequentially perform the synchronization operation or the synchronization releasing operation according to a preset order.

Herein, the at least one power generator may include at least one diesel power generator, at least one wind power generator, and at least one photovoltaic power generator.

Meanwhile, in the providing of the power, when the charge amount is less than a preset maximum permissible charge amount and greater than a preset safety range, the at least one battery system may alternately repeatedly change the reference frequency between a rated frequency and a frequency greater than the rated frequency by a preset value.

Meanwhile, in the providing of the power, when the charge amount is greater than a preset maximum permissible charge amount and less than a preset safety range, the at least one battery system may alternately repeatedly change a reference frequency between the rated frequency a frequency lower than the rated frequency by a preset value.

Advantageous Effects

According to the present invention, cost required for implementing an operational system and communication infrastructure for a stand-alone micro-grid using renewable energy can be remarkably reduced so that initial investment cost can be also reduced, thus economic feasibility can be improved.

In addition, according to the present invention, since an unmanned control of the stand-alone micro-grid is possible by using an accurate control algorithm, a charge amount of a battery can be easily managed so that power can be stably supplied in the long term even under the unstable output conditions of a wind power generator and a photovoltaic power generator.

DESCRIPTION OF DRAWINGS

FIG. 9 is a view showing a chart illustrating an autonomous control example when a battery charge amount is excessive in the stand-alone micro-grid autonomous control system and method according to an embodiment of the present invention.

FIG. 11 is a view showing a graph illustrating an autonomous control result example when a battery charge amount is excessive in the stand-alone micro-grid autonomous control system and method according to an embodiment of the present invention.

FIG. 12 is a view showing a chart illustrating an autonomous control example when a battery charge amount is insufficient in the stand-alone micro-grid autonomous control system and method according to an embodiment of the present invention.

MODE FOR INVENTION

Figure 1:
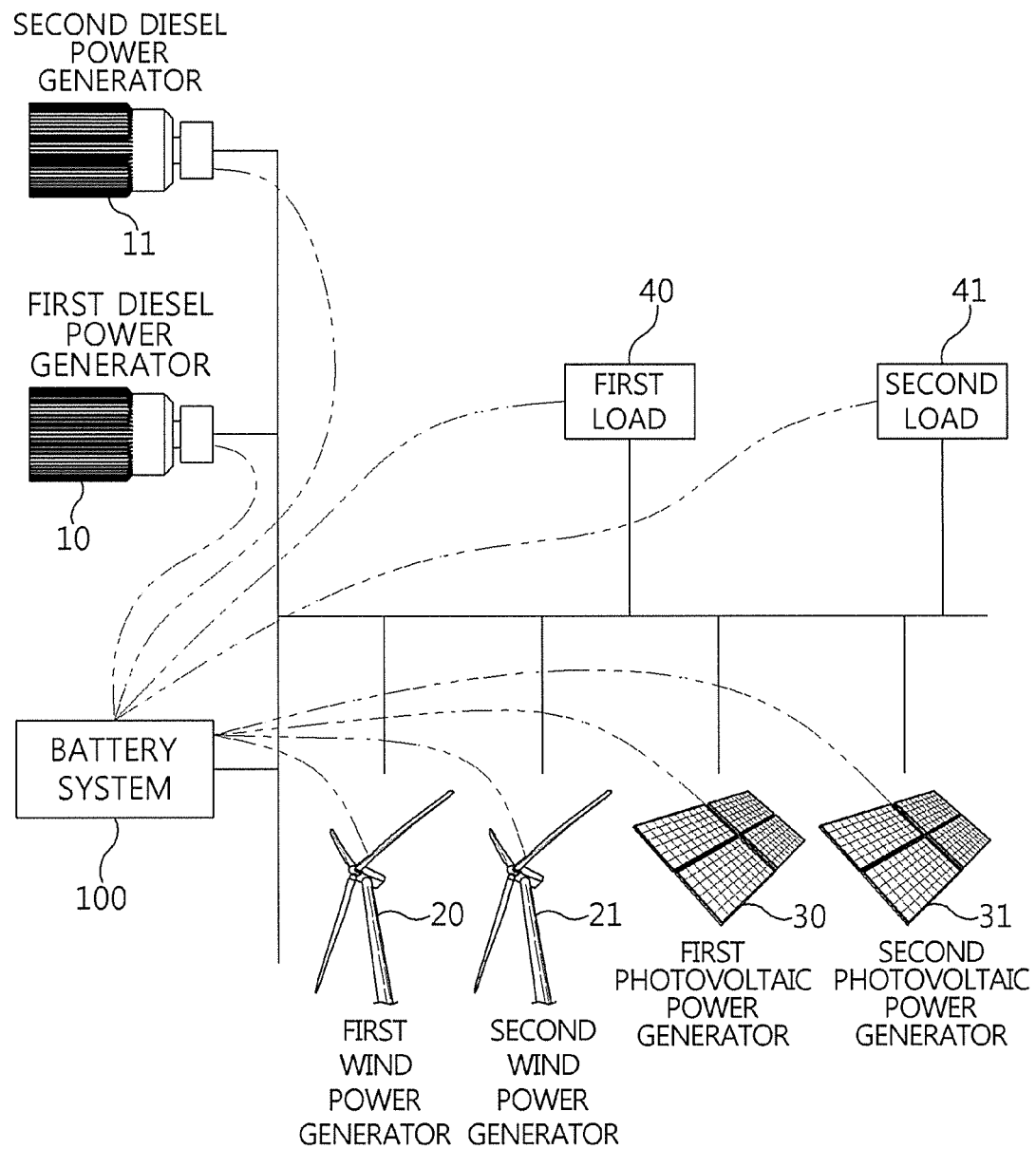
FIG. 1 is a view illustrating a stand-alone micro-grid autonomous control system according to an embodiment of the present invention.

Exemplary embodiments of the present invention will be described below with reference to the accompanying drawings in order for those skilled in the art to be able to easily implement the technical spirit of the present invention. First, in the specification, in adding reference numerals to components throughout the drawings, it should be noted that like reference numerals designate like components even though components are shown in different drawings. In describing the present invention, well-known functions or constructions will not be described in detail since they may unnecessarily obscure the understanding of the present invention.

Hereinafter, a system and method of autonomously controlling a stand-alone micro-grid according to an embodiment of the present invention will be described with reference to accompanied drawings.

Figure 2:
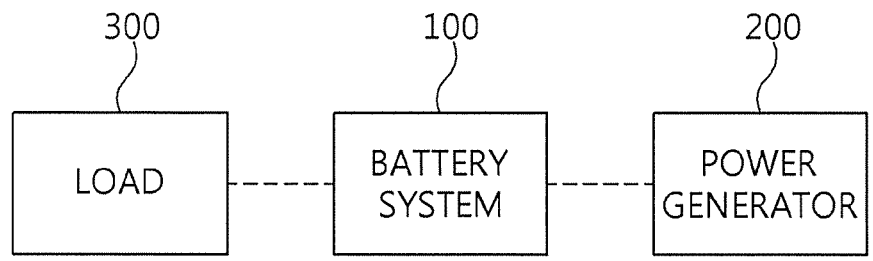
FIG. 2 is a view schematically showing the stand-alone micro-grid autonomous control system according to an embodiment of the present invention.
Figure 3:
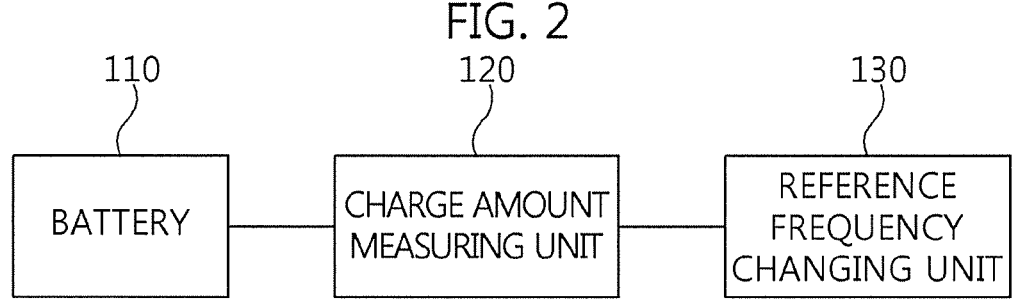
FIG. 3 is a view illustrating a battery system of the stand-alone micro-grid autonomous control system according to an embodiment of the present invention.
Figure 4:
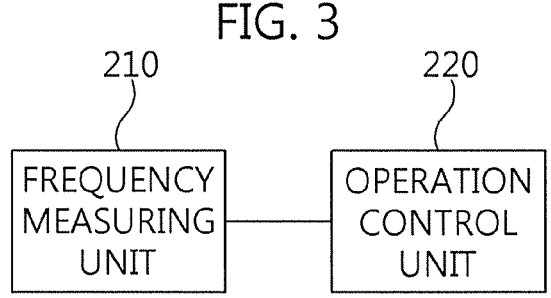
FIG. 4 is a view illustrating a power generator of the stand-alone micro-grid autonomous control system according to an embodiment of the present invention.
Figure 5:
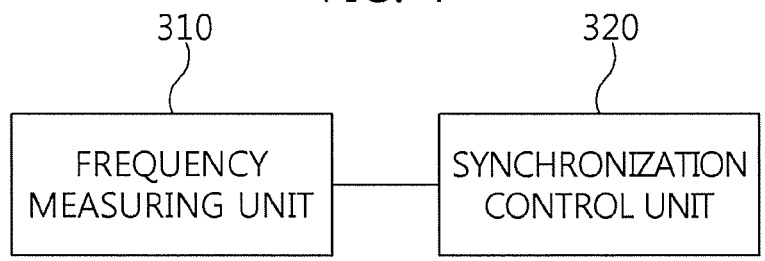
FIG. 5 is a flowchart illustrating a load of the stand-alone micro-grid autonomous control system according to an embodiment of the present invention.
Figure 6:
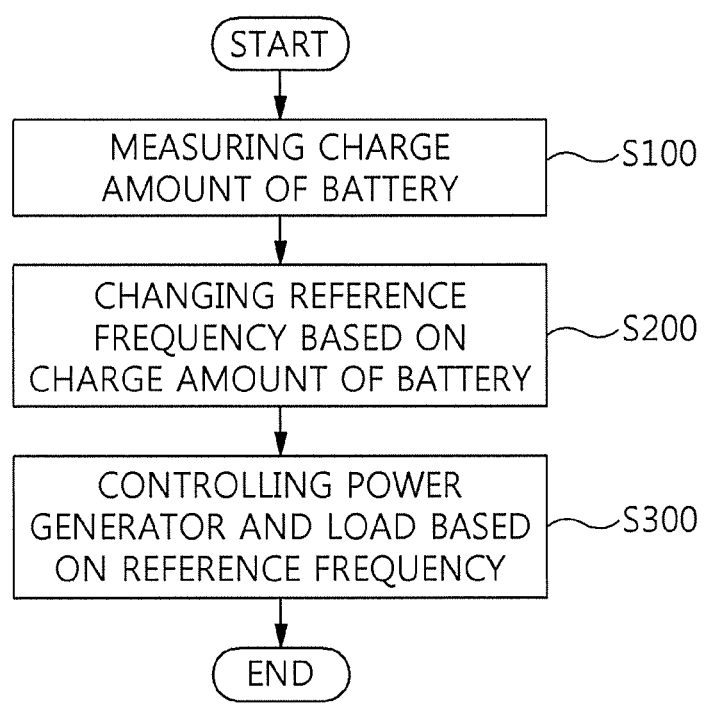
FIG. 6 is a view showing a flowchart illustrating a stand-alone micro-grid autonomous control method according to an embodiment of the present invention.
Figure 7:
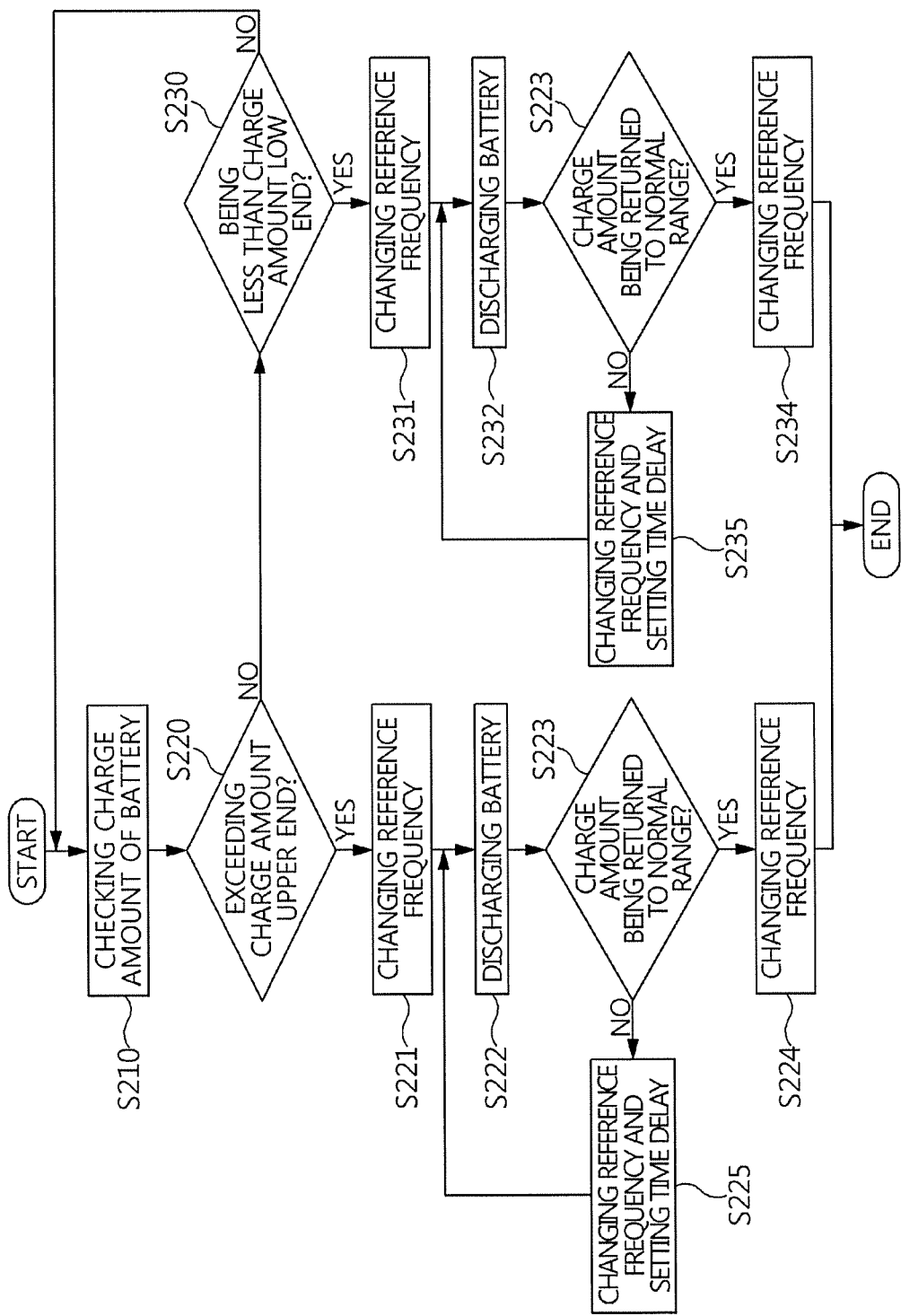
FIG. 7 is a view showing a flowchart illustrating changing a base frequency in the stand-alone micro-grid autonomous control method according to an embodiment of the present invention.
Figure 8:
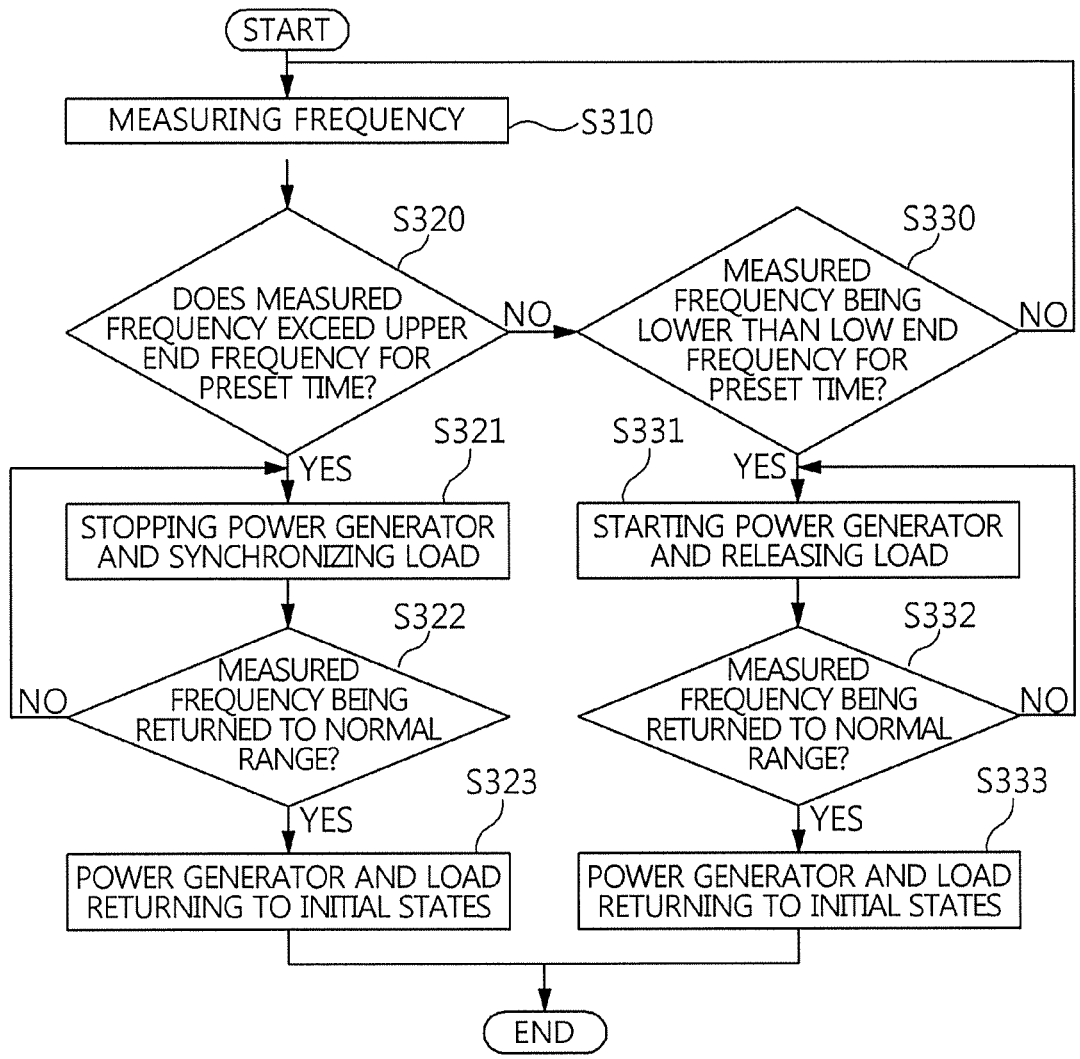
FIG. 8 is a view showing a flowchart illustrating controlling the power generator and the load in the stand-alone micro-grid autonomous control method according to an embodiment of the present invention.
Figure 10:
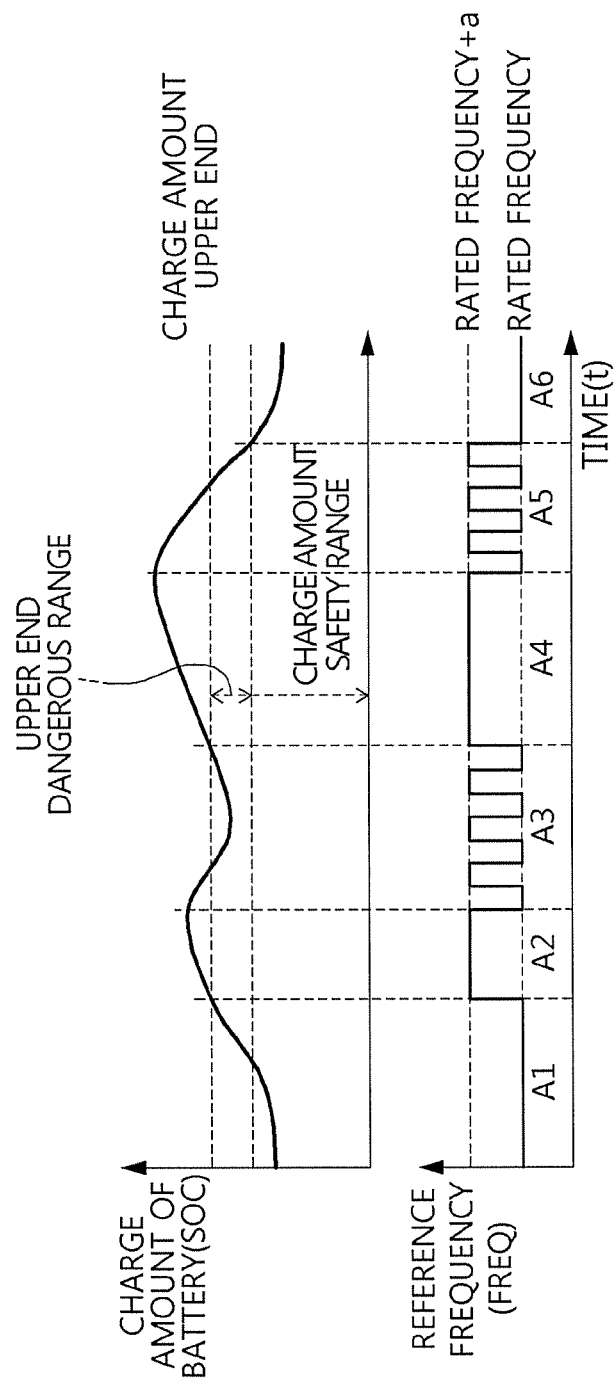
FIG. 10 is a view showing a graph illustrating an autonomous control example when a battery charge amount is excessive in the stand-alone micro-grid autonomous control system and method according to an embodiment of the present invention.
Figure 13:
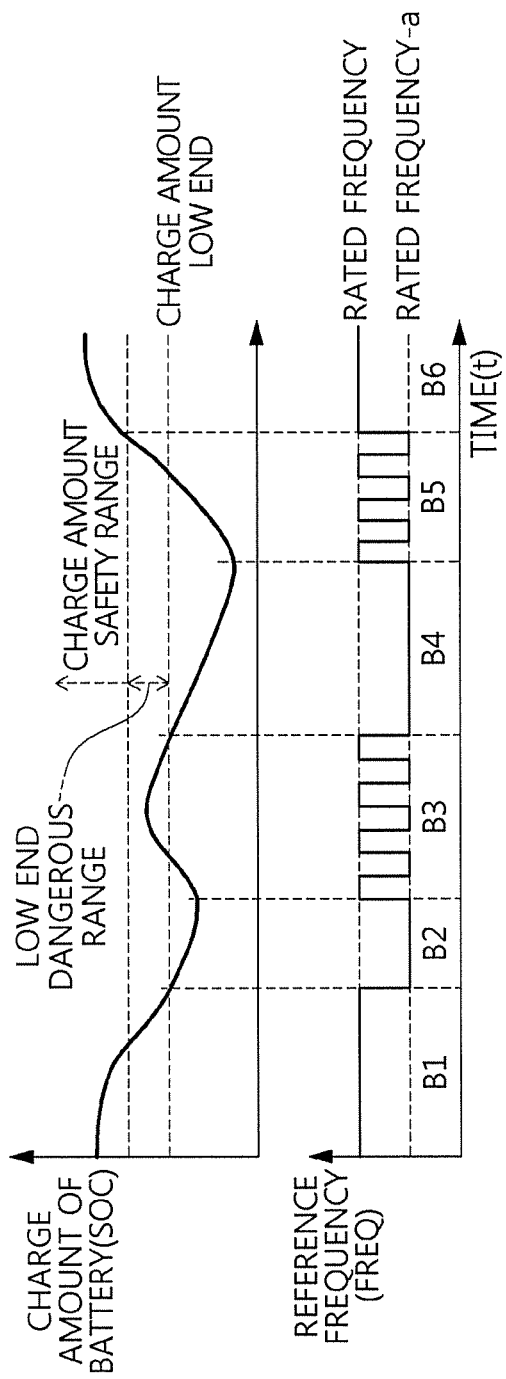
FIG. 13 is a view showing a graph illustrating an autonomous control result example when a battery charge amount is excessive in the stand-alone micro-grid autonomous control system and method according to an embodiment of the present invention.

FIG. 1 is a view illustrating a stand-alone micro-grid autonomous control system according to an embodiment of the present invention, FIG. 2 is a view schematically showing the stand-alone micro-grid autonomous control system according to an embodiment of the present invention, FIG. 3 is a view illustrating a battery system of the stand-alone micro-grid autonomous control system according to an embodiment of the present invention, FIG. 4 is a view illustrating a power generator of the stand-alone micro-grid autonomous control system according to an embodiment of the present invention, FIG. 5 is a flowchart illustrating a load of the stand-alone micro-grid autonomous control system according to an embodiment of the present invention, FIG. 6 is a view showing a flowchart illustrating a stand-alone micro-grid autonomous control method according to an embodiment of the present invention, FIG. 7 is a view showing a flowchart illustrating changing a base frequency in the stand-alone micro-grid autonomous control method according to an embodiment of the present invention, FIG. 8 is a view showing a flowchart illustrating controlling the power generator and the load in the stand-alone micro-grid autonomous control method according to an embodiment of the present invention, FIG. 9 is a view showing a chart illustrating an autonomous control example when a battery charge amount is excessive in the stand-alone micro-grid autonomous control system and method according to an embodiment of the present invention, FIG. 10 is a view showing a graph illustrating an autonomous control example when a battery charge amount is excessive in the stand-alone micro-grid autonomous control system and method according to an embodiment of the present invention, FIG. 11 is a view showing a graph illustrating an autonomous control result example when a battery charge amount is excessive in the stand-alone micro-grid autonomous control system and method according to an embodiment of the present invention, FIG. 12 is a view showing a chart illustrating an autonomous control example when a battery charge amount is insufficient in the stand-alone micro-grid autonomous control system and method according to an embodiment of the present invention, and FIG. 13 is a view showing a graph illustrating an autonomous control result example when a battery charge amount is excessive in the stand-alone micro-grid autonomous control system and method according to an embodiment of the present invention.

As shown in FIG. 1, in a stand-alone micro-grid autonomous control system according to an embodiment of the present invention, a stand-alone micro-grid includes: a battery system 100 providing power when power is insufficient after charging remaining power; at least one of wind power generators 20 and 21 and photovoltaic power generators 30 and 31 which generates power by using a renewable energy source, diesel power generators 10 and 11, and loads 40 and 41.

Herein, the battery system 100, the at least one of wind power generators 20 and 21 and photovoltaic power generators 30 and 31 which generates power by using a renewable energy source, the diesel power generators 10 and 11, and the loads 40 and 41 may respectively be individual apparatuses constituting the stand-alone micro-grid Herein, a power generator generating power by using the renewable energy source is shown as the wind power generators 20 and 21 and the photovoltaic power generators 30 and 31. However, in addition, a hydroelectric power generator and a geothermal power generator may be further included.

Herein, in the stand-alone micro-grid autonomous control system according to an embodiment of the present invention, the battery system 100 directly changes a frequency thereof according to a charge amount of the battery system 100, and controls respective apparatuses including the wind power generators 20 and 21, the photovoltaic power generators 30 and 31, the diesel power generators 10 and 11, and the loads 40 and 41 which constitute the stand-alone micro-grid such that the respective apparatuses directly sense the changed output frequency of the battery system 100 and autonomously operate in predetermined operational modes.

In other words, in the stand-alone micro-grid autonomous control system according to an embodiment of the present invention, the battery system 100 manages a frequency of the entire power system, and a frequency commonly sensed by all power generators 10, 11, 20, 21, 30, and 31, and the loads 40 and 41 is used as a medium for exchanging information.

In a general power system, a frequency may not be used as a medium for exchanging information in a normal state since the frequency is not fixed and changes within a regulated frequency range according to a characteristic of an AC power system operated by a number of synchronized power generators which are operated in a parallel. However, in case of the stand-alone micro-grid, the battery system 100 adjusts power supply and demand by providing and receiving main power. For the same, a power conditioning system (PSC) of the battery system 100 operates in a constant voltage constant frequency (CVCF) operational mode. In addition, different to a synchronous power generator, the battery system 100 operates while a frequency in the stand-alone micro-grid is fixed since a control characteristic of the battery system 100 is fast. In addition, since the battery system 100 is a main power supplying source, the battery system 100 may manage a frequency of the entire system.

Accordingly, the battery system 100 of the stand-alone micro-grid autonomous control system according to an embodiment of the present invention maintains an output frequency of the battery system 100 in a rated frequency (f_n) when the battery system 100 is operating within a proper range of the charge amount by directly monitoring a charge amount state of the battery system 100.

Meanwhile, the battery system 100 may change the output frequency to a frequency of (f_n+a) in which a preset value is added to the rated frequency when the charge amount becomes excessive. Herein, the respective apparatuses including the power generators 10, 11, 20, 21, 30, and 31, and the loads 40 and 41 constituting the stand-alone micro-grid respectively may sense the frequency of the battery system 100, and respectively determine that a current charge amount is excessive when the sensed frequencies are higher than the rated frequency. When it is determined that the charge amount of the battery system 100 is excessive, whether or not to operate the power generators 10, 11, 20, 21, 30, and 31, and the loads 40 and 41 constituting the stand-alone micro-grid may be determined according to a size of a preset frequency and a time at which the corresponding frequency is sensed.

In more detail, when the charge amount of the battery system 100 is excessive, the power generators using renewable energy, the wind power generators 20 and 21 and the photovoltaic power generators 30 and 31 may stop generating power and the loads may be autonomously synchronized with the stand-alone micro-grid power system.

Meanwhile, herein, a value of the rated frequency (f_n) may be 60 Hz.

As shown in FIG. 2, the stand-alone micro-grid autonomous control system according to an embodiment of the present invention includes a battery system 100, a power generator 200, and a load 300. Herein, FIG. 2 is a view schematically showing the stand-alone micro-grid autonomous control system according to an embodiment of the present invention, as the stand-alone micro-grid autonomous control system according to an embodiment of the present invention which is shown in FIG. 1, at least one battery system 100, at least one power generator 200, and at least one load 300 may be included.

The battery system 100 directly measures its own charge amount, and changes its own output frequency according when its own charge amount exceeds a preset upper end, when its charge amount is less than a preset lower end, and when its own charge amount is between the preset upper end and the preset lower end. Then, the battery system 100 provides power having the changed output frequency. Herein, the output frequency may have a meaning identical to a reference frequency.

In more detail, the battery system 100 may output a frequency of f_n+a (Hz) which is greater than the rated frequency of f_n (Hz) when its own charge amount exceeds the preset upper end, output a frequency of f_n−a (Hz) which is lower than the rated frequency of f_n (Hz) when its own charge amount is less than the preset low end, and output the rated frequency of f_n (Hz) when its own charge amount is between the preset upper end and the preset lower end.

As shown in FIG. 1, the power generator 200 may include a wind power generator, a photovoltaic power generator, and a power generator using renewable energy, and a diesel power generator. Herein, the power generator 200 may measure a frequency sensed by itself, and stop operating by determining that the charge amount of the battery system 100 is excessive when a frequency of f_n+a (Hz) which is greater than f_n (Hz) is sensed. In addition, the power generator 200 may start operating by determining that the charge amount is insufficient when a frequency of f_n−a (Hz) which is lower than the rated frequency of f_n (Hz) is sensed. In addition, the power generator 200 may return to an initial state thereof by determining that the charge amount is a normal state when a frequency of f_n (Hz) which is the rated frequency is sensed.

Herein, within the power generator 200, a preset priority may be present. In other words, in stopping generating power when the charge amount of the battery system 100 is excessive, the diesel power generator using additional fuel may stop generating power, and then the power generator using renewable energy source may stop generating power when the charge amount of the battery system 100 is still excessive.

Meanwhile, in staring generating power when the charge amount of the battery system 100 is insufficient, the power generator using renewable energy source may start generating power, and then the diesel power generator may start generating power when the charge amount is still insufficient.

In addition, the power generator 200 may be set to start generating power when a measured frequency exceeds an upper end frequency for a preset time or more. Alternatively, the power generator 200 may be set to stop generating power when the measured frequency is lower than a low end frequency for a preset time or more.

The load 300 may measure a frequency sensed by itself, and may be autonomously synchronized with the power system by determining that the charge amount of the battery system 100 is excessive when the load 300 detects a frequency of f_n+a (Hz) which is greater than f_n (Hz). In addition, the load 300 may autonomously release synchronization with the power system by determining that the charge amount of the battery system 100 is insufficient when a frequency of f_n−a (Hz) which is lower than the rated frequency of f_n (Hz) is sensed. In addition, in case of a normal state, the load 300 may return to an initial state thereof by determining that the charge amount of the battery system 100 is in a normal state when a frequency of f_n (Hz) which is the rated frequency is sensed.

In addition, the load 300 may be set to be synchronized with the power system when a measured frequency exceeds an upper end frequency for a preset time or more. Alternatively, the load 300 may be set to release synchronization with the power system when the measured frequency is lower than a low end frequency for a preset time or more.

As shown in FIG. 3, the battery system 100 includes a battery 110, a charge amount measuring unit 120, and a reference frequency changing unit 130.

The battery 110 charges and stores surplus power of the power system, and performs providing or receiving of main power of the stand-alone micro-grid system by providing the charged surplus power when power of the power system supply is insufficient.

Meanwhile, the charge amount measuring unit 120 measures a charge amount (SOC: state of charge) of the battery 110 in real time, and transfers the measured charge amount to the reference frequency changing unit 130.

The reference frequency changing unit 130 compares the charge amount (SOC) of the battery 110 which is measured by the charge amount measuring unit 120 with a maximum permissible charge amount (SOC_max) value that is an upper end of a preset charge amount (SOC). When the charge amount of the battery 110 is greater than the maximum permissible charge amount (SOC_max), the reference frequency changing unit 130 changes a reference frequency, and when the charge amount of the battery 110 is less than the maximum permissible charge amount (SOC_max), the reference frequency changing unit 130 does not change the reference frequency, and continuously receives the charge amount of the battery 110 from the charge amount measuring unit 120.

Herein, when the measured charge amount (SOC) of the battery 110 is greater than the maximum permissible charge amount (SOC_max) that is the upper end of the preset charge amount (SOC), the reference frequency changing unit 130 changes the reference frequency of the battery system 100 to f_n+a (Hz) that is greater than the rated frequency of f_n (Hz).

For example, assuming that the rated frequency is 60 Hz, the reference frequency changing unit 130 may change the reference frequency to 60.2 Hz greater than the rated frequency. Herein, an output frequency of the battery system 100 is controlled to be 60.2 Hz, and as described above, since a frequency of the entire stand-alone micro-grid system corresponds to the output frequency of the battery system 100, the frequency of the entire stand-alone micro-grid system is controlled to be 60.2 Hz.

Herein, for the power generator 200 and the load 300, the power generator may stop operating, and the load 300 may be synchronized with the power system when a frequency equal to or greater than a preset frequency is sensed for a preset time or more. Descriptions thereof will be described in detail later.

As the output frequency of the battery system 100 is changed, the power generator 200 and the load 300 operate according to a preset operation. Herein, the charge amount measuring unit 120 continuously measures the charge amount of the battery 110, and provides the measured charge amount to the reference frequency changing unit 130.

Herein, the reference frequency changing unit 130 changes again the reference frequency to a frequency greater than the rated frequency when the battery 110 is being charging by determining whether the battery 110 is being charged or discharged. When the battery 110 is being discharged, the reference frequency changing unit 130 maintains a current state until the charge amount of the battery 110 becomes less than a maximum permissible charge amount (SOC_max) that is an upper end of a preset charge amount (SOC).

In other words, when the battery 110 is over charged, the reference frequency of the battery system 100 is maintained to f_n+a (Hz) that is greater than the f_n (Hz) that is the rated frequency until the battery 110 becomes sufficiently discharged.

Herein, while the reference frequency is maintained to the frequency that is greater than the rated frequency of f_n (Hz), the diesel power generator and the power generator using renewable energy are sequentially stop operating according to a preset order, and the loads are synchronized with the power system according to a preset order.

In other words, when the battery 110 is over charged, in order to reduce the charge amount of the battery 110, the reference frequency is highly maintained until the output of the battery is sufficiently discharged, and the battery 110 waits a preset time so that respective apparatuses constituting the stand-alone micro-grid sequentially stop operating or are synchronized with the power system. In other words, when the battery 110 starts discharging, there is no need that the power generator 200 additionally stops operating or the load 300 is additionally synchronized with the power system, so that the battery 110 waits until the charge amount thereof returns to a normal range.

Herein, the charge amount measuring unit 120 measures the charge amount of the battery 110, and transfers the measured charge amount to the reference frequency changing unit 130. Herein, the reference frequency changing unit 130 checks whether or not the charge amount of the battery 110 is less than the maximum permissible charge amount (SOC_max) that is the upper end of the preset charge amount (SOC), and waits a preset time after changing again the reference frequency when the charge amount of the battery 110 is maintained to be greater than the maximum permissible charge amount (SOC_max) that is the upper end of the preset charge amount (SOC).

Herein, similar to the reference frequency changing unit 130 that waits the preset time, respective apparatuses constituting the stand-alone micro-grid may also have a preset waiting time. Herein, the waiting times of the respective apparatuses constituting the stand-alone micro-grid may be set to be greater than the waiting time of the reference frequency changing unit 130.

Herein, for the reference frequency changing unit 130, a situation in which the charge amount of the battery 110 is increased may be present, wherein the charge amount of the battery 110 is increased as the battery 110 starts charging when the load is rapidly decreased or a power generation amount of the power generator using renewable energy is rapidly increased while the charge amount of the battery 110 is reduced by changing the reference frequency. In such a situation, the battery 110 may maintain to become again a discharging state by changing the reference frequency.

Meanwhile, when the charge amount of the battery 110 is less than the maximum permissible charge amount (SOC_max) that is the upper end of the preset charge amount (SOC), the reference frequency changing unit 130 may lower f_n+a (Hz) that is the current reference frequency to the rated frequency (f_n). Herein, apparatuses forcibly operated for discharging the battery 110 are returned to initial states thereof.

Alternatively, the reference frequency changing unit 130 compares the charge amount (SOC) of the battery 110 which is measured by the charge amount measuring unit 120 with a minimum permissible charge amount (SOC_min) value that is a low end of the preset charge amount (SOC). When the charge amount (SOC) of the battery 110 is less than the minimum permissible charge amount (SOC_min), the reference frequency changing unit 130 changes the reference frequency, and when the charge amount of the battery 110 is greater than the minimum permissible charge amount (SOC_min), the reference frequency changing unit 130 does not change the reference frequency, and continuously receives the charge amount of the battery 110 from the charge amount measuring unit 120.

Herein, when the charge amount (SOC) of the battery 110 which is measured by the reference frequency changing unit 130 is less than the minimum permissible charge amount (SOC_min) that is the low end of the preset charge amount (SOC), the reference frequency changing unit 130 changes the reference frequency of the battery system 100 to f_n−a (Hz) that is lower than the rated frequency of f_n (Hz).

For example, assuming that the rated frequency is 60 Hz, the reference frequency changing unit 130 may change the reference frequency to 59.8 Hz that is lower than the rated frequency. Herein, the output frequency of the battery system 100 is controlled to be 59.8 Hz. As described above, since the frequency of the entire stand-alone micro-grid system corresponds to the output frequency of the battery system 100, the frequency of the entire stand-alone micro-grid system is controlled to be 59.8 Hz.

Herein, the power generator 200 may start operating and the load 300 may release synchronization with the power system when a frequency equal to or lower than a preset frequency is sensed for a preset time or more, and descriptions thereof will be described later.

As the output frequency of the battery system 100 is changed, the power generator 200 and the load 300 operate according to a preset operation. Herein, the charge amount measuring unit 120 continuously measures the charge amount of the battery 110, and provides the measured charge amount to the reference frequency changing unit 130.

Herein, the reference frequency changing unit 130 changes again the reference frequency to a frequency lower than the rated frequency when the battery 110 is being discharged by determining whether the battery 110 is being charged or discharged. When the battery 110 is being charged, the reference frequency changing unit 130 maintains a current state until the charge amount of the battery 110 becomes greater than the maximum permissible charge amount (SOC_min) that is an upper end of a preset charge amount (SOC).

In other words, when the battery 110 is over discharged, the reference frequency of the battery system 100 is maintained to f_n−a (Hz) that is lower than the rated frequency of f_n (Hz) until the battery 110 is sufficiently charged.

Herein, while the reference frequency is maintained to the frequency equal to or lower than the rated frequency of f_n (Hz), the diesel power generator and the power generator using renewable energy start generating power according to a predetermined order, and the loads release synchronization with the power system according to a predetermined order.

In other words, when the battery 110 is over discharged, in order to increase the charge amount of the battery 110, the reference frequency is maintained low until the output of the battery becomes sufficiently charged, and the battery 110 waits a preset time so that respective apparatuses constituting the stand-alone micro-grid sequentially start operating or release synchronization with from the power system. In other words, when the battery 110 starts charging, there is no need that the power generator 200 additionally starts operating or the load 300 additionally releases synchronization with the power system, so that the battery 110 waits until the charge amount returns to a normal range.

Herein, the charge amount measuring unit 120 measures the charge amount of the battery 110, and transfers the measured charge amount to the reference frequency changing unit 130. Herein, the reference frequency changing unit 130 checks whether or not the charge amount of the battery 110 is greater than the minimum permissible charge amount (SOC_min) that is the low end of the preset charge amount (SOC), and when the charge amount of the battery 110 is still maintained less than the minimum permissible charge amount (SOC_min), the reference frequency changing unit 130 changes again the reference frequency, and waits a preset time.

Herein, similar to the reference frequency changing unit 130 that waits the preset time, respective apparatuses constituting the stand-alone micro-grid may also have a preset waiting time. Herein, the waiting times of the respective apparatuses constituting the stand-alone micro-grid may be set to be greater than the waiting time of the reference frequency changing unit 130.

Herein, for the reference frequency changing unit 130, a situation in which the charge amount of the battery 110 is decreased may be present, wherein the charge amount of the battery 110 is decreased as the battery 110 starts discharging when the load is rapidly increased or a power generation amount of the power generator using renewable energy is rapidly decreased while the charge amount of the battery 110 is charged by changing the reference frequency. In such a situation, the battery 110 may be controlled to again enter a charging state by changing the reference frequency.

Meanwhile, when the charge amount of the battery 110 becomes greater than the minimum permissible charge amount (SOC_min) that is the low end of the preset charge amount (SOC), the reference frequency changing unit 130 may raise the current reference frequency of f_n−a (Hz) to the rated frequency (f_n). Herein, apparatuses operated for charging the battery 110 return to initial states thereof.

As shown in FIG. 4, the power generator 200 of the stand-alone micro-grid autonomous control system according to an embodiment of the present invention includes a frequency measuring unit 210, and an operation control unit 220. As shown in FIG. 5, the load 300 of the stand-alone micro-grid autonomous control system according to an embodiment of the present invention includes a frequency measuring unit 310 and a synchronization control unit 320.

Herein, operations of the frequency measuring unit 210 of the power generator 200 and the frequency measuring unit 310 of the load 300 are similar, and operations of the operation control unit 220 of the power generator 200 and the synchronization control unit 320 of the load 300 are also similar, thus descriptions thereof will be described at the same time.

The frequency measuring unit 210 of the power generator 200 and the frequency measuring unit 310 of the load 300 respectively measure a reference frequency output from the battery system 100, and respectively transfer the measured reference frequencies to the operation control unit 220 and the synchronization control unit 320. Herein, the operation control unit 220 of the power generator 200 and the synchronization control unit 320 of the load 300 check the current charge amount of the battery 110 of the battery system 100 by using the measured frequencies, and determine operations of the power generator 200 and the load 300.

For example, when the rated frequency is 60 Hz and the frequency measuring unit 210 of the power generator 200 and the frequency measuring unit 310 of the load 300 measures frequencies of 60.2 Hz, the operation control unit 220 of the power generator 200 and the synchronization control unit 320 of the load 300 respectively determined that the battery 110 is currently over charged, and power generator 200 stops generating power and the load 300 is synchronized with the power system.

Alternatively, when the frequency measuring unit 210 of the power generator 200 and the frequency measuring unit 310 of the load 300 measure frequencies of 59.8 Hz, the operation control unit 220 of the power generator 200 and the synchronization control unit 320 of the load 300 respectively determine that the battery 110 is currently over discharged, and the power generator 200 starts generating power and the load 300 releases synchronization with the power system.

Referring again FIGS. 4 and 5 at the same time, operations of the power generator 200 and the load 300 will be described in more detail.

The frequency measuring unit 210 of the power generator 200 and the frequency measuring unit 310 of the load 300 measure sensed frequencies, and respectively transfer measured frequencies to the operation control unit 220 and the synchronization control unit 320. Herein, the operation control unit 220 and the synchronization control unit 320 respectively determine whether or not the measured frequencies are greater than the frequency of f_n+a (Hz) that is the preset upper end.

When the measured frequencies are greater than the frequency of f_n+a (Hz) that is the preset upper end, the operation control unit 220 and the synchronization control unit 320 check whether or not the measured frequencies are maintained greater than the frequency of f_n+a (Hz) for a preset time.

In other words, the operation control unit 220 and the synchronization control unit 320 respectively determine whether or not frequencies greater than the upper end frequency are measured for a preset time. Herein, when frequencies greater than the upper end are measured for the preset time, the operation control unit 220 and the synchronization control unit 320 respectively determine that the battery 110 of the battery system 100 is over charged.

When the battery 110 is over charged, the operation control unit 220 stops an operation of the power generator 200 to which the operation control unit 220 belongs, and the synchronization control unit 320 synchronizes the load 300 to which the synchronization control unit 320 belongs with the power system. Herein, as described above, in the power generator 200, the diesel power generator, the wind power generator, the photovoltaic power generator, etc. may be included. In addition, duration time conditions different from each other may be set to the diesel power generator, the wind power generator, the photovoltaic power generator, and the load.

In other words, a sequence of stopping operations of the diesel power generator, the wind power generator, and the photovoltaic power generator, and a sequence of synchronizing the loads with the power system may be determined according to a preset condition.

For example, in the stand-alone micro-grid autonomous control system according to an embodiment of the present invention, as the sequence of stopping operations of the diesel power generator, the wind power generator and the sequence of synchronizing the loads with the power system, among the power generator 200 constituting the stand-alone micro-grid, an operation of the diesel power generator requiring additional fuel and causing environmental pollution may be stopped first, the an operation of the wind power generator is stopped, and then an operation of the photovoltaic power generator is stopped. When the charge amount of the battery is still over charged after stopping the operation of the photovoltaic power generator, the load may be connected to the power system, but the present invention is not limited thereto.

Meanwhile, when the charge amount of the battery 110 is insufficient so that the reference frequency is changed to f_n−a (Hz) lower than the rated frequency of f_n (Hz), the frequency measuring unit 210 of the power generator 200 and the frequency measuring unit 310 of the load 300 respectively measure sensed frequencies, and respectively transfer the measured frequencies to the operation control unit 220 and the synchronization control unit 320. Herein, the operation control unit 220 and the synchronization control unit 320 respectively determine whether or not measured frequencies are lower than the frequency of f_n−a (Hz) that is the preset low end.

When the measured frequencies are lower than the frequency of f_n−a (Hz) that is the preset low end, the operation control unit 220 and the synchronization control unit 320 respectively check whether or not the measured frequencies are maintained lower than the frequency of f_n−a (Hz) for a preset time.

In other words, the operation control unit 220 and the synchronization control unit 320 respectively determine whether or not frequencies lower than the low end frequency are measured for the preset time. Herein, when frequencies lower than the low end frequency are measured for the preset time, the operation control unit 220 and the synchronization control unit 320 respectively determine that the battery 110 of the battery system 100 is over discharged.

When the battery 110 is over discharged, the operation control unit 220 starts an operation of the power generator 200 to which the operation control unit 220 belongs, and the synchronization control unit 320 releases synchronization of the load 300 with the power system to which the synchronization control unit 320 belongs. Herein, as described above, in the power generator 200, the diesel power generator, the wind power generator, the photovoltaic power generator, etc. may be included. In addition, duration time conditions different from each other may be set to the diesel power generator, the wind power generator, the photovoltaic power generator, and the loads.

In other words, a sequence of starting operations of the diesel power generator, the wind power generator, and the photovoltaic power generator, and a sequence of releasing the loads from the power system may be determined according to a preset condition.

For example, in the stand-alone micro-grid autonomous control system according to an embodiment of the present invention, as the sequence of starting operations of the diesel power generator, the wind power generator, and the photovoltaic power generator and the sequence of releasing the loads from the power system, the loads may release synchronization with the power system first. When the battery 110 is still over discharged, operations of the wind power generator and the photovoltaic power generator which do not require additional fuel may be started, and an operation of the diesel power generator requiring additional fuel and causing environmental pollution may be started last, but the present invention is not limited thereto.

For example, when setting values of duration time conditions for respective apparatuses constituting the stand-alone micro-grid autonomous control system according to an embodiment of the present invention are set as photovoltaic power generator (ON)<wind power generator (ON)<first diesel power generator (ON)<second diesel power generator (ON)<first load (OFF)<second load (OFF), respective apparatuses operate according to the preset order. When a situation in which the charge amount of the battery is recovered as the battery enters a charging state while respective apparatuses are controlled in the preset temporal order occurs, there is no need to additionally control the respective apparatuses.

Herein, the battery system 100 controls the frequency such that the duration time conditions of the respective apparatuses are not satisfied by alternately repeatedly changing the reference frequency output to the low end frequency and to the rated frequency at a predetermined time interval. Accordingly, it is possible to prevent the respective apparatuses from being additionally operated.

When the charge amount of the battery 110 is returned to a normal range between the maximum permissible charge amount (SOC_max) and the minimum permissible charge amount (SOC_min), the reference frequency of the battery system 100 is returned to the rated frequency, and the power generator 200 and the load 300 respectively return to initial states thereof.

As shown in FIG. 6, a stand-alone micro-grid autonomous control method according to an embodiment of the present invention includes: step S100 of measuring a charge amount of the battery 1101; step S200 of changing a reference frequency based on the charge amount of the battery 110; and step S300 of controlling a power generator 200 and a load 300 based on the reference frequency.

In step S100 of measuring the charge amount of the battery 110, the charge amount measuring unit 120 may continuously measure the charge amount of the battery 110, and transfer the measured charge amount to the reference frequency changing unit 130.

In step S200 of changing the reference frequency based on the charge amount of the battery 110, the battery system 100 may directly measure its own charge amount, and change own output frequency according to when its own charge amount exceeds a preset upper end, when its own charge amount is less than a preset low end, and when its own charge amount is between the preset upper end and the preset low end. Then, the battery system 100 may provide power having the changed output frequency (reference frequency) to the stand-alone micro-grid.

In more detail, the battery system 100 may output a frequency of f_n+a (Hz) greater than a rated frequency of f_n (Hz) when its own charge amount exceeds the preset upper end, output a frequency of f_n−a (Hz) lower than the rated frequency of f_n (Hz) when its own charge amount is less than the preset low end, and output the rated frequency of f_n (Hz) when its own charge amount is in a normal state that is between the preset upper end and the preset low end.

In step S300 of controlling the power generator 200 and the load 300 based on the reference frequency, the power generator 200 may measure a frequency sensed by itself, and stop operating by determining that the charge amount of the battery system 100 is excessive when a frequency of f_n+a (Hz) greater than f_n (Hz) is sensed. In addition, the power generator 200 may start operating by determining that the charge amount of the battery system 100 is insufficient when a frequency of f_n−a (Hz) lower than the rated frequency of f_n (Hz) is sensed. In addition, when a frequency of a normal state which is the rated frequency of f_n (Hz) is sensed, the power generator 200 may determine that the charge amount of the battery system 100 is in a normal state, and return to an initial state thereof.

In addition, in step S300 of controlling the power generator 200 and the load 300 based on the reference frequency, the load 300 may measure a frequency sensed by itself, and may be autonomously synchronized with to the power system by determining that the charge amount of the battery system 100 is excessive when a frequency of f_n+a (Hz) greater than f_n (Hz) is sensed. In addition, the load 300 may release synchronization with the power system by determining that the charge amount of the battery system 100 is insufficient when a frequency of f_n−a (Hz) lower than the rated frequency of f_n (Hz) is sensed. In addition, when a frequency of a normal state that is the rated frequency of f_n (Hz) is sensed, the load 300 may determine that the charge amount of the battery system 100 is in a normal state, and returns to an initial state thereof.

FIG. 7 is a flowchart illustrating step S200 of changing the reference frequency based on the charge amount of the battery 110.

First, in step S210, the charge amount measuring unit 120 checks a charge amount (SOC: State Of Charge) in real time, and transfers the measured charge amount to the reference frequency changing unit 130.

Herein, in step S220, the reference frequency changing unit 130 determines whether or not the charge amount of the battery 110 exceeds a maximum permissible charge amount (SOC_max) by comparing the charge amount (SOC) of the battery 110 measured by the charge amount measuring unit 120 with a maximum permissible charge amount (SOC_max) value that is an upper end of a preset charge amount (SOC).

When the charge amount of the battery 110 exceeds the maximum permissible charge amount (SOC_max), in step S221, the reference frequency changing unit 130 changes the reference frequency of the battery system 100 to f_n+a (Hz) greater than the rated frequency of f_n (Hz). Herein, for the power generator 200 and the load 300, when a frequency equal to or greater than a preset frequency is sensed for a preset time or more, the power generator 200 stops operating, and the load 300 is synchronized with the power system. Accordingly in step S221, the battery 110 is discharged. Herein, the charge amount measuring unit 120 continuously measures the charge amount of the battery 110, and provides the measured charge amount to the reference frequency changing unit 130. Then, in step S223, the reference frequency changing unit 130 determines whether or not the current charge amount of the battery 110 has returned to a normal range that is less than the maximum permissible charge amount (SOC_max) by comparing the current charge amount of the battery 110 with the maximum permissible charge amount (SOC_max). Herein, in step S225, the reference frequency changing unit 130 additionally set a time delay by setting the reference frequency to f_n+a (Hz) greater than f_n (Hz) when the charge amount of the battery 110 does not return to a normal range. Herein, according to the set time delay, the diesel power generator and the power generator using renewable energy stop generating power according to a predetermined order, and the loads are synchronized with the power system according to a predetermined order. Meanwhile, in step S224, the reference frequency changing unit 130 changes again the current reference frequency of f_n+a (Hz) to the rated frequency (f_n) when the charge amount of the battery 110 is less than the maximum permissible charge amount (SOC_max) that is the upper end of the preset charge amount (SOC). Herein, apparatuses forcibly operated for discharging the battery 110 return to initial state thereof.

Meanwhile, in the determined whether or not the charge amount of the battery 110 exceeds the maximum permissible charge amount (SOC_max) in step S220, when the charge amount of the battery 110 does not exceed the maximum permissible charge amount (SOC_max), in step S230, the reference frequency changing unit 130 determines whether or not the charge amount of the battery 110 is less than the minimum permissible charge amount (SOC_min).

As a result, when it is determined that the charge amount is not less than the minimum permissible charge amount (SOC_min), in step S210, the reference frequency changing unit 130 does not change the reference frequency, and the charge amount measuring unit 120 continuously checks the charge amount of the battery 110.

Meanwhile, when the charge amount of the battery 110 is less than the minimum permissible charge amount (SOC_min), in step S231, the reference frequency changing unit 130 changes the reference frequency of the battery system 100 to f_n−a (Hz) lower than the rated frequency of f_n (Hz). Herein, for the power generator 200 and the load 300, when a frequency equal to or lower than a preset frequency is sensed for a preset time or more, the power generator 200 start operating, and the load 300 releases synchronization with the power system. Accordingly, in step S232, the battery 110 is charged. Herein, the charge amount measuring unit 120 continuously measures the charge amount of the battery 110, and provides the measured charge amount to the reference frequency changing unit 130. Then, in step S233, the reference frequency changing unit 130 determines whether or not the current charge amount of the battery 110 has returned to a normal range that is greater than the minimum permissible charge amount (SOC_min) by comparing the current charge amount of the battery 110 with the minimum permissible charge amount (SOC_min). Herein, in step S235, the reference frequency changing unit 130 sets the reference frequency to f_n−a (Hz) lower than f_n (Hz), and additionally set a time delay when the charge amount of the battery 110 is not returned to a normal range. Herein, according to the set time delay, the diesel power generator and the power generator using renewable energy start operating according to a predetermined order, and the loads release synchronization with the power system according to a predetermined order. Meanwhile, in step S234, the reference frequency changing unit 130 changes again the current reference frequency of f_n−a (Hz) to the rated frequency (f_n) when the charge amount of the battery 110 is greater than the minimum permissible charge amount (SOC_min) that is the low end of the preset charge amount (SOC). Herein, apparatuses operated for charging the battery 110 return again to initial states thereof.

FIG. 8 is a view illustrating step S300 of controlling the power generator 200 and the load 300 based on the reference frequency.

In step S310, the frequency measuring unit 210 of the power generator 200 and the frequency measuring unit 310 of the load 300 respectively measure a reference frequency output from the battery system 100, and respectively transfer the measured reference frequencies to the operation control unit 220 and the synchronization control unit 320.

Herein, in step S320, the operation control unit 220 and the synchronization control unit 320 respectively determine whether or not the measured frequencies maintain for a preset time or more, and respectively determine whether or not the measured frequencies maintain states greater than the upper end frequency of f_n+a (Hz). Herein, when a frequency greater than the upper end frequency is measured for a preset time or more, the operation control unit 220 and the synchronization control unit 320 respectively determine that the battery 110 of the battery system 100 is over charged. Herein, in step S321, the operation control unit 220 stops an operation of the power generator 200 to which the operation control unit 220 belongs, and the synchronization control unit 320 synchronies the load 300 with the power system to which the synchronization control unit 320 belongs. Herein, as described above, in the power generator 200, the diesel power generator, the wind power generator, the photovoltaic power generator, etc. may be included, an order of stopping operations of the diesel power generator, the wind power generator, and the photovoltaic power generator, and an order of synchronizing the loads with the power system may be determined according to a preset condition. Then, in step S322, the operation control unit 220 of the power generator 200 and the synchronization control unit 320 of the load 300 respectively determine whether or not the measured frequencies return to a normal range that is lower than the upper end frequency of f_n+a (Hz).

When the measured frequencies do not return to a normal range that is lower than the upper end frequency of f_n+a (Hz), and a preset time elapses, in step S321, an operation of the power generator is additionally stopped, or a load is newly synchronized with the power system. Meanwhile, when the measured frequencies return to a normal range that is lower the upper end frequency of f_n+a (Hz), in step S323, the power generator 200 and the load 300 return to initial states thereof.

Meanwhile, in step S320 of determining whether or not the measured frequencies maintain a state greater than the upper end frequency of f_n+a (Hz), when the measured frequencies are lower than the upper end frequency of f_n+a (Hz), in step S330, the operation control unit 220 and the synchronization control unit 320 respectively determine whether or not the measured frequencies are maintained for a preset time or more, and respectively determine whether or not the measured frequencies are lower than the low end frequency of f_n−a (Hz). Herein, when a frequency lower than the low end frequency is measured for a preset time or more, the operation control unit 220 and the synchronization control unit 320 respectively determine that the battery 110 of the battery system 100 is over discharged. Herein, in step S331, the operation control unit 220 starts an operation of the power generator 200 to which the operation control unit 220 belongs, and the synchronization control unit 320 releases synchronization of the load to which the connection control unit 32 belongs with the power system. Herein, as described above, in the power generator 200, the diesel power generator, the wind power generator, the photovoltaic power generator, etc. may be included, and an order of starting operations of the diesel power generator, the wind power generator, and the photovoltaic power generator, and an order of releasing the loads from the power system may be determined according to a preset condition. Then, in step S332, the operation control unit 220 of the power generator 200 and the synchronization control unit 320 of the load 300 respectively determine whether or not the measured frequencies return to a normal range that is greater than the low end frequency of f_n−a (Hz).

When the measured frequencies do not return to a normal range that is greater than the low end frequency of f_n−a (Hz), and a preset time elapses, in step S331, an operation of the power generator 200 is additionally started, or synchronization of a load synchronized with the power system is additionally released. Meanwhile, when the measured frequencies return to a normal range that is greater than the low end frequency of f_n–a (Hz), in step S333, the power generator 200 and the load 300 return to initial states thereof.

Herein, in step of S330 of determining whether or not the measured frequencies are maintained lower than the end frequency of f_n–a (Hz), when the measured frequencies are greater than the low end frequency of f_n–a (Hz), in step S310, the frequency measuring unit 210 of the power generator 200 and the frequency measuring unit 310 of the load 300 respectively measure again the reference frequency output from the battery system 100.

Referring again to FIG. 1, views of FIGS. 9, 10, and 11 will be described together. As shown in FIG. 1, it is assumed that the stand-alone micro-grid is configured to include a battery system 100, a first diesel power generator 10, a second diesel power generator 11, a first wind power generator 20, a second wind power generator 21, a first photovoltaic power generator 30, a second photovoltaic power generator 31, and a first load 40 and a second load 41 which are controllable.

Herein, it is assumed that initial states of respective apparatuses constituting the stand-alone micro-grid are as follow: the battery system 100 is operating, operations of the first diesel power generator 10 and the second diesel power generator 11 are stopped, the first wind power generator 20, the second wind power generator 21, the first photovoltaic power generator 30, and the second photovoltaic power generator 31 generate power, and a rated frequency is 60 Hz.

Herein, when a power generating amount of the first wind power generator 20, the second wind power generator 21, the first photovoltaic power generator 30, and the second photovoltaic power generator 31 becomes greater than a load, and surplus power is continuously charged in the battery system 100 so that a charge amount of the battery system 100 becomes excessive, as described above, the reference frequency changing unit 130 of the battery system 100 changes the reference frequency to 60.2 Hz greater than the rated frequency of 60 Hz.

Herein, the first diesel power generator 10 may be set to stop operating when a frequency equal to or greater than 60.2 Hz is measured for one minute or more, the second diesel power generator 11 may be set to stop operating when a frequency equal to or greater than 60.2 Hz is measured for two minutes or more, the first photovoltaic power generator 30 may be set to stop operating when a frequency equal to or greater than 60.2 Hz is measured for three minutes or more, the second photovoltaic power generator 31 may be set to stop operating when a frequency equal to or greater than 60.2 Hz is measured for four minutes or more, the first wind power generator 20 may be set to stop operating when a frequency equal to or greater than 60.2 Hz is measured for five minutes or more, the second wind power generator 21 may be set to stop operating when a frequency equal to or greater than 60.2 Hz is measured for six minutes or more, the controllable first load 40 may be set to be synchronized with the power system when a frequency equal to or greater than 60.2 Hz is measured for seven minutes or more, and the controllable second load 41 may be set to be synchronized with the power system when a frequency equal to or greater than 60.2 Hz is measured for eight minutes or more.

In addition, all apparatuses may be set to return to initial states thereof when the rated frequency of 60 Hz is maintained for five minutes or more.

Considering the above initial states of the battery system 100, the first diesel power generator 10, the second diesel power generator 11, the first wind power generator 20, the second wind power generator 21, the first photovoltaic power generator 30, the second photovoltaic power generator 31, and the controllable first load 40 and the second load 41, although a frequency of 60.2 Hz is maintained equal to or less than two minutes, states of respective apparatuses constituting the stand-alone micro-grid system are not changed since the operations of the first diesel power generator 10 and the second diesel power generator are initially stopped. However, when a frequency of 60.2 Hz is maintained equal to or greater than three minutes, the operations or the first photovoltaic power generator 30, the second photovoltaic power generator 31, the first wind power generator 20, the second wind power generator 21 are sequentially stopped in one minute intervals. When a frequency of 60.2 Hz is maintained equal to or greater than seven minutes, the first load 40 and the second load 41 are sequentially synchronized with the power system.

In other words, operations of the respective apparatuses constituting the stand-alone micro-grid system may sequentially stop in a preset time interval according to a preset priority, or may be synchronized with or release synchronization with the power system in a preset time interval according to a preset priority.

The above operations will be described in more detail with reference to FIGS. 10 and 11. FIG. 10 is a view showing a graph illustrating an autonomous control example when a charge amount of a battery is excessive. Herein, the graph may be divided into temporal sections of A1, A2, A3, A4, A5, and A6.

As shown in FIG. 10, when a charge amount of the battery 110 becomes excessive, respective apparatuses are controlled to start operating or stop operating according to a preset order. When the charge amount of the battery 110 exceeds a charge amount upper end (maximum permissible charge amount), the reference frequency changing unit 130 of the battery system 100 changes a reference frequency to an upper end frequency of 60.2 Hz, and a system frequency of the stand-alone micro-grid becomes 60.2 Hz. Herein, the respective apparatuses constituting the stand-alone micro-grid are operated to prevent the charge amount of the battery 110 from being increased when the respective apparatuses sense the upper end frequency of 60.2 Hz, and elapsing times preset for the respective apparatuses are satisfied. In addition, when the charge amount of the battery 110 completely returns to a normal level, the reference frequency changing unit 130 of the battery system 100 changes the reference frequency to the rated frequency of 60 Hz, and the respective apparatuses return to initial states thereof by sensing the frequency of 60 Hz and determining that the charge amount of the battery 110 is returned to a normal level.

Meanwhile, by setting an upper end dangerous range that is a dead zone range between an charge amount upper end (maximum permissible charge amount) and a charge amount safety range, in order to control unnecessary operating of the respective apparatuses, the reference frequency changing unit 130 of the battery system 100 changes the reference frequency between the rated frequency (60 Hz) and the upper end frequency (60.2 Hz) in a predetermined period so the elapsing time of the respective apparatuses are not satisfied when the charge amount is within the upper end dangerous range, and the battery 110 is being discharged. In other words, the rated frequency and the upper end frequency are alternately repeatedly changed.

As shown in FIG. 11, within a temporal section A1, a charge amount of the battery increases and reaches a charge amount upper end. Herein, the reference frequency changing unit 130 of the battery system 100 does not change a reference frequency of the battery system 100 yet, so that the output frequency of the battery system 100 is maintained in 60 Hz, and respective apparatuses constituting the stand-alone micro-grid maintain initial states thereof.

Then, within a temporal section A2, the charge amount of the battery exceeds a charge amount upper end (maximum permissible charge amount), and the reference frequency changing unit 130 of the battery system 100 changes the reference frequency to 60.2 Hz. Accordingly, the output frequency of the battery system 100 becomes 60.2 Hz, and when two minutes elapses as time goes, the first diesel power generator 10 and the second diesel power generator 11 stop operating, and when three minutes elapses, the first photovoltaic power generator 30 stops generating power, and when four minutes elapses, second photovoltaic power generator 31 stops generating power.

Within a temporal section A3, the battery 110 is being discharged, and the charge amount enters into an upper end dangerous range that is between the charge amount upper end (maximum permissible charge amount) and the charge amount safety range. Herein, it is expected that the charge amount of the battery 110 is decreased without additionally controlling operations of the apparatuses constituting the stand-alone micro-grid. Accordingly, the reference frequency changing unit 130 of the battery system 100 periodically changes the reference frequency between the 60 Hz and 60.2 Hz so that the apparatuses constituting the stand-alone micro-grid are maintained in states identical within the temporal section A2.

However, within a temporal section A3, a situation where the charge amount of the battery 110 rises again may occur, and within a temporal section A4, the charge amount of the battery 110 exceeds again the charge amount upper end. Herein, the reference frequency changing unit 130 of the battery system 100 sets again the reference frequency to 60.2 Hz, and when four minutes elapses as time goes, all of the first diesel power generator 10, the second diesel power generator 11, the first photovoltaic power generator 30, and the second photovoltaic power generator 31 stop operating. Subsequently, when five minutes elapses, the first wind power generator 20 stops generating power, and when six minutes elapses, the second wind power generator 21 stops generating power. In addition, when seven minutes elapses, the first load 40 is synchronized with the power system.

Within a temporal section A5 the battery 110 is switched again to a discharging state, similar to the temporal section A3, the charge amount enters into the upper end dangerous range that is between the charge amount upper end (maximum permissible charge amount) and the charge amount safety range. Herein, it is expected that the charge amount of the battery 110 is decreased without additionally controlling operations of the apparatuses constituting the stand-alone micro-grid. Accordingly, the reference frequency changing unit 130 of the battery system 100 periodically changes the reference frequency between the 60 Hz and 60.2 Hz, so that the apparatuses constituting the stand-alone micro-grid maintain initial states thereof as within the temporal section A4.

Then, within a temporal section A6, the charge amount of the battery 110 reaches the charge amount safety range, and the reference frequency changing unit 130 of the battery system 100 changes the reference frequency to 60 Hz. Then, when five minutes elapses, apparatuses constituting the stand-alone micro-grid return to initial states.

FIGS. 12 and 13 are views showing an autonomous control example when a charge amount of the battery 110 is insufficient. As described with reference to FIG. 9, when the charge amount of the battery 110 is insufficient, the reference frequency changing unit 130 of the battery system 100 sets a reference frequency to 59.8 Hz. Herein, according to a time that the frequency of 59.8 Hz is maintained, apparatuses constituting the stand-alone micro-grid are sequentially stopped, or synchronized with the power system.

In addition, as shown in temporal sections B2 and B4 of FIG. 13, when the charge amount of the battery 110 is less than a charge amount low end (minimum permissible charge amount), the reference frequency changing unit 130 of the battery system 100 sets the reference frequency to a value lower than the rated frequency. In addition, as shown in temporal sections B3 and B5, when the charge amount of the battery 110 is in a low end dangerous range between the charge amount low end (minimum permissible charge amount) and a charge amount safety range, the reference frequency changing unit 130 of the battery system 100 periodically changes the reference frequency between the rated frequency and the reference frequency set the value lower than the rated frequency so that the apparatuses constituting the stand-alone micro-grid maintain states identical to the previous temporal section.

Meanwhile, in the stand-alone micro-grid autonomous control system and method according to an embodiment of the present invention, in a method of changing, by the reference frequency changing unit 130, a reference frequency of the battery system 100, the reference frequency of the battery may be step-wisely divided, and operational methods of apparatuses constituting the stand-alone micro-grid may be temporally and step-wisely set. In other words, the charge amount upper end and the charge amount low end may be step-wisely divided, and when the charge amount exceeds a first step charge amount upper end, the reference frequency is set to a rated frequency+a, and when the charge amount exceed a second step charge amount upper end, the reference frequency may be set to a rated frequency+b. In addition, herein, since the reference frequency may be set by dividing into the rated frequency+a and the rated frequency+b, operational conditions of the apparatuses constituting the stand-alone micro-grid may be changed according to the reference frequency that is divided as above.

Similarly, the reference frequency changing unit 130 of the battery system 100 may set the reference frequency to a rated frequency−a when the charge amount of the battery 110 is less than a first step charge amount low end, and set the reference frequency to a rated frequency−b when the charge amount of the battery 110 is less than a second step charge amount low end. Herein, since the reference frequency is set by dividing into the rated frequency−a and the rated frequency−b, operational conditions of the apparatuses constituting the stand-alone micro-grid may be changed according to the reference frequency condition divided as above.

In addition, in the stand-alone micro-grid autonomous control system and method according to an embodiment of the present invention, in order to provide status information of the charge amount of the battery 110 to the apparatuses constituting the stand-alone micro-grid, a frequency is used, but, additionally, a voltage may be used for providing the status information of the charge amount of the battery 110 to the apparatuses constituting the stand-alone micro-grid. In other words, when the charge amount of the battery 110 is excessive or insufficient, rather than changing the frequency, a voltage output from the battery 110 may be changed, and the respective apparatuses may be operated by sensing the output voltage. A detailed description of the above method is as described above since the a medium used for providing status information of the charge amount of the battery 110 is changed from the frequency to a voltage, thus overlapped descriptions will be omitted.

In addition, in the stand-alone micro-grid autonomous control system and method according to an embodiment of the present invention, the method of using the frequency and the method of using the voltage may be used at the same time. In other words, the battery 110 may independently control the voltage and the frequency, and the respective apparatuses constituting the stand-alone micro-grid may separately sense the frequency and the voltage. Thus, a method of autonomously controlling the stand-alone micro-grid by using the frequency and the voltage at the same time may be also possible.

When using the stand-alone micro-grid autonomous control system and method according to an embodiment of the present invention, information of power output from the battery 110 and the charge amount may be transmitted to the apparatuses constituting the stand-alone micro-grid without including an additional communication apparatus. Accordingly, charge amount of the battery 110 may be efficiently managed without implementing an operational system required for implementing the stand-alone micro-grid, and without implementing a communication infrastructure.

Although this invention has been described in terms of a preferred embodiment, various changes and modifications can be made without departing from the spirit and scope of the invention. Those skilled in the art will appreciate that the various changes and modifications may be made to the present invention without departing from the spirit and scope of the invention as set forth in the appended claims.

The invention claimed is:

1. A system for autonomously controlling a stand-alone micro-grid, the system comprising:
    at least one battery system directly changing a reference frequency thereof according to a charge amount, and providing power having the changed reference frequency;
    at least one power generator measuring the changed reference frequency, and starting or stopping power generation based on the changed reference frequency; and
    at least one load measuring the changed reference frequency, and performing a synchronization operation or a synchronization releasing operation based on the changed reference frequency,
    wherein, according to a time period during which the changed reference frequency is maintained, the at least one power generator sequentially starts or stops the power generation according to a preset order, and the at least one load sequentially performs the synchronization operation or the synchronization releasing operation according to a preset order, and
    wherein the reference frequency is a medium for exchanging information and is managed only by the at least one battery system.

2. The system of claim 1, wherein, when the charge amount is greater than a preset maximum permissible charge amount, the at least one battery system changes the reference frequency to be greater than a rated frequency by a preset value.

3. The system of claim 2, wherein, when the changed reference frequency is greater than the rated frequency by the preset value, the at least one power generator stops the power generation and the at least one load performs the synchronization operation.

4. The system of claim 1, wherein, when the charge amount is less than a preset minimum permissible charge amount, the at least one battery system changes the reference frequency to be lower than a rated frequency by a preset value.

5. The system of claim 4, wherein, when the changed reference frequency is lower than the rated frequency by the preset value, the at least one power generator stops the power generation and the at least one load performs the synchronization releasing operation.

6. The system of claim 1, wherein the at least one power generator includes at least one diesel power generator, at least one wind power generator, and at least one photovoltaic power generator.

7. The system of claim 1, wherein, when the charge amount is less than a preset maximum permissible charge amount and is greater than a preset safety range, the at least one battery system alternately repeatedly changes the reference frequency between a rated frequency, and a frequency greater than the rated frequency by a preset value.

8. The system of claim 1, wherein, when the charge amount is greater than a preset minimum permissible charge amount and is less than a preset safety range, the at least one battery system alternately repeatedly changes the reference frequency between a rated frequency and a frequency lower than the rated frequency by a preset value.

9. A method of autonomously controlling a stand-alone micro-grid, the method comprising:
    measuring, by at least one battery system, a charge amount;
    directly changing, by the least one battery system, a reference frequency thereof according to the charge amount, and providing power having the changed reference frequency;
    measuring, by at least one power generator, the changed reference frequency and starting or stopping power generation based on the changed reference frequency;
    measuring, by at least one load, the changed reference frequency and performing a synchronization operation or a synchronization releasing operation based on the changed reference frequency; and
    according to a time period during which the changed reference frequency is maintained, sequentially starting or stopping, by the at least one power generator, the power generation according to a preset order, and sequentially performing, by the least one load, the synchronization operation or the synchronization releasing operation according to a preset order, and
    wherein the reference frequency is a medium for exchanging information and is managed only by the at least one battery system.

10. The method of claim 9, wherein, in the directly changing, when the charge amount is greater than a preset maximum permissible charge amount, the at least one battery system changes the reference frequency to be greater than a rated frequency by a preset value.

11. The method of claim 10, wherein, when the changed reference frequency is greater that the rated frequency by the preset value, the at least one power generator stops the power generation and the at least one load performs the synchronization operation.

12. The method of claim 9, wherein, in the directly changing, when the charge amount is less than a preset minimum permissible charge amount, the at least one battery system changes the reference frequency to be lower than a rated frequency by a preset value.

13. The method of claim 12, wherein, when the changed reference frequency is lower than the rated frequency by the preset value, the at least one power generator stops the power generation and the at least load performs the synchronization releasing operation.

14. The method of claim 9, wherein, the at least one power generator includes at least one diesel power generator, at least one wind power generator, and at least one photovoltaic power generator.

15. The method of claim 9, wherein, in the directly changing, when the charge amount is less than a preset maximum permissible charge amount and greater than a preset safety range, the at least one battery system alternately repeatedly changes the reference frequency between a rated frequency and a frequency greater than the rated frequency by a preset value.

16. The method of claim 9, wherein, in the directly changing, when the charge amount is greater than a preset maximum permissible charge amount and less than a preset safety range, the at least one battery system alternately repeatedly changes the reference frequency between the rated frequency a frequency lower than the rated frequency by a preset value.

* * * * *